United States Patent [19]

Hosaka

[11] Patent Number: 4,937,668

[45] Date of Patent: Jun. 26, 1990

[54] METHOD AND APPARATUS FOR TRANSMITTING VIDEO INFORMATION

[75] Inventor: Sumio Hosaka, Tokorozawa, Japan

[73] Assignee: Pioneer Electronic Corporation, Tokyo, Japan

[21] Appl. No.: 251,728

[22] Filed: Oct. 3, 1988

[30] Foreign Application Priority Data

Mar. 15, 1988 [JP] Japan ................................. 63-60957

[51] Int. Cl.$^5$ .............................................. H04N 7/04
[52] U.S. Cl. .................................... 358/146; 358/147; 358/105
[58] Field of Search ............... 358/141, 142, 146, 147, 358/181, 133, 136, 312, 105; 360/9.1, 10.1, 35.1, 11.1

[56] References Cited

U.S. PATENT DOCUMENTS

3,715,483  2/1973  Limb et al. ......................... 358/133
4,620,225  10/1986  Wendland et al. ................... 358/141

FOREIGN PATENT DOCUMENTS

2691970  8/1982  United Kingdom ................ 358/136

*Primary Examiner*—James J. Groody
*Assistant Examiner*—David E. Harvey
*Attorney, Agent, or Firm*—Foley & Lardner, Schwartz, Jeffery, Schwaab, Mack, Blumenthal & Evans

[57] ABSTRACT

A method and an apparatus for transmitting a video signal. A two-dimensional picture formed by the video signal is divided into a plurality of extracting periods, frames, fields, and areas. A first signal portion represents a moving area. The plurality of areas for each unit extracting period corresponding to successive N (N being a natural number) frames of the video signal. An extracted video signal is formed by extracting from one field the first signal portion in a moving area, and from another field second signal portions representing non-moving areas. A position identification signal which indicates the position of the moving area formed by the first signal portion are transmitted in combination.

10 Claims, 3 Drawing Sheets

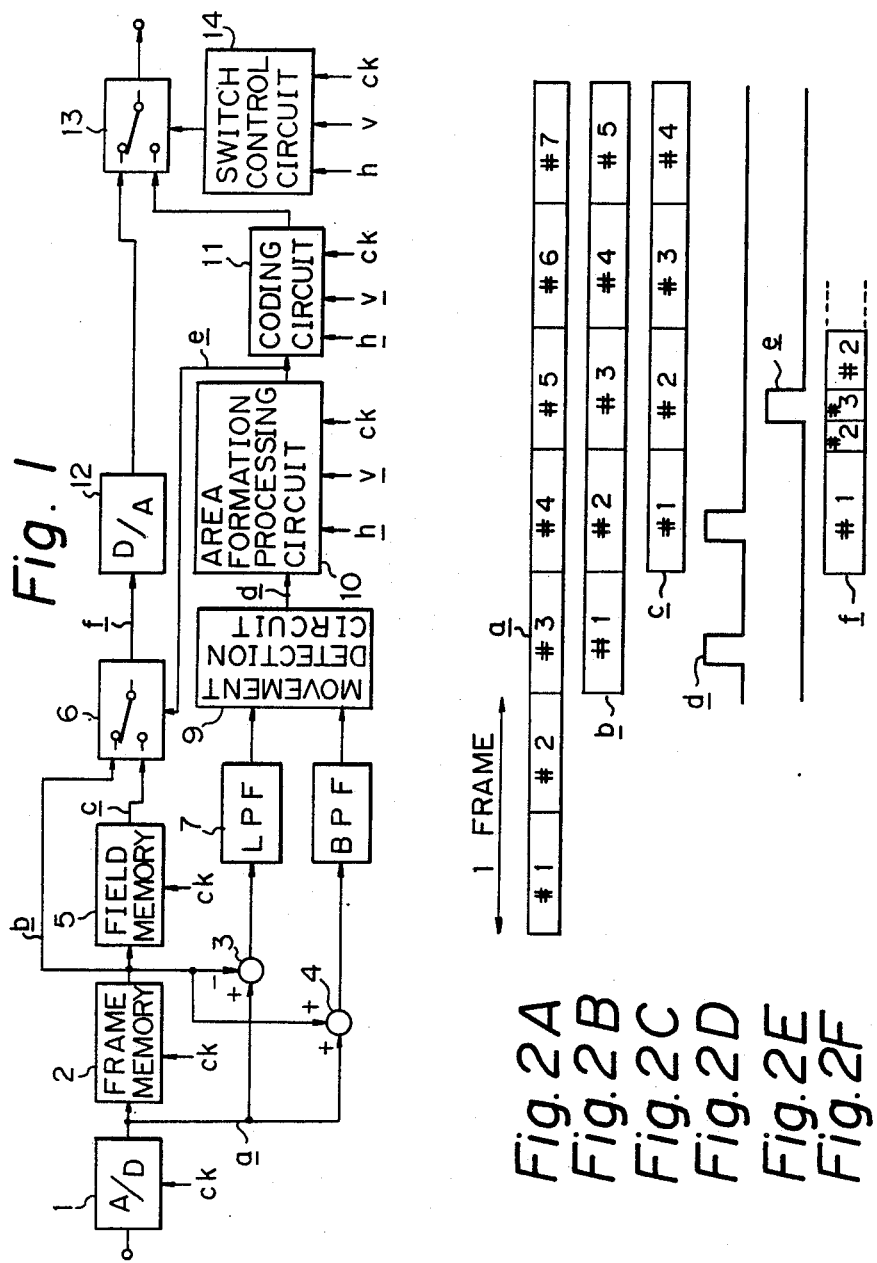

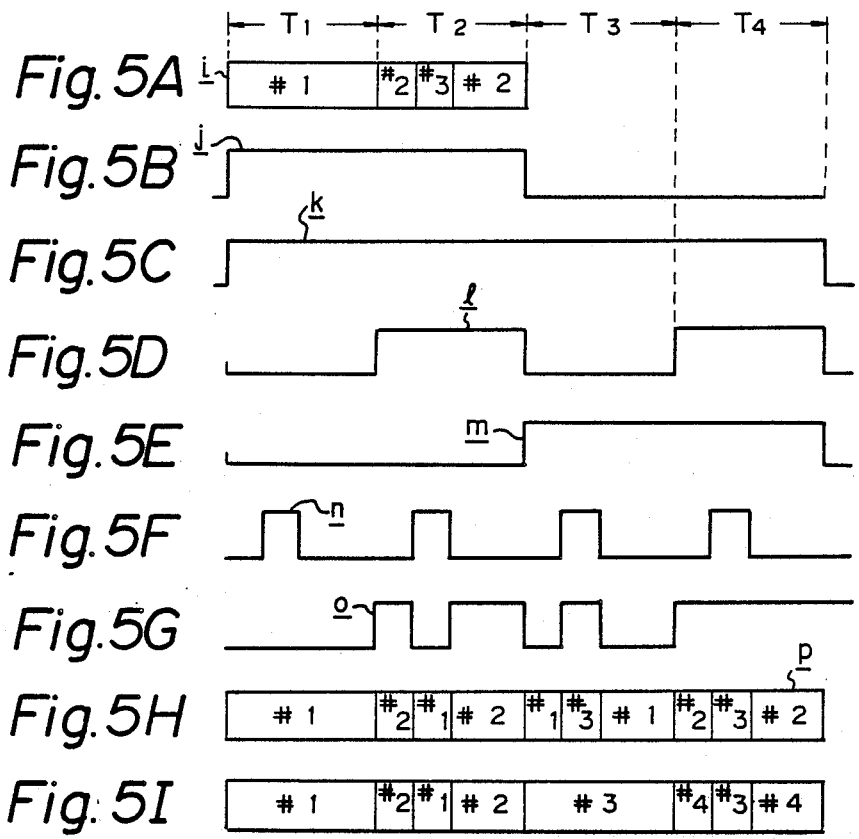

METHOD AND APPARATUS FOR TRANSMITTING VIDEO INFORMATION

BACKGROUND OF THE INVENTION

1. Field of the Invention

The present invention relates to method and apparatus for transmitting video information.

2. Description of Background Information

As a transmission system for transmitting video signals of a plurality of channels through a single transmitting line or for recording and reproducing. The video signals by using a single recording medium, the inventor or the present application and others have already devised a system that extracts some of unit section signals from N (N being a natural number) channel video signals, thereby slimming-out the video signals, and transmitting the extracted unit section signals after of the extracted time-division multiplexing of the extracted. This system is disclosed in Japanese Patent Application No. P62-196875.

With this system, the transmission time of video signals can be substantially shortened or otherwise the recording time of a recording medium can be substantially extended. However, each of N channels of video signals obtained on the receiving side or the reproducing side is, for example, a signal consisting of sections each extracted from every N fields of the video signal. Therefore, it is necessary to employ a process of storing the video signal of each channel in corresponding memories, and reading-out the contents stored in each memory repeatedly for a period of N fields, in order to provide output signals. As a result, there are problems such that the resonance of the reproduced picture is reduced in vertical direction, or unnatural movements are generated in the reproduced picture.

OBJECT AND SUMMARY OF THE INVENTION

The present invention is based on the recognition of the above-described problem. The object of the present invention is to provide a video signal transmission system which can transmit a plurality of channels through a single transmission line or can record and reproduce the video signals using a single recording medium, while preventing the reduction in the vertical resolution or the generation of unnatural movements in the reproduced picture.

A video signal transmission system according to the present invention is characterized by the following step: Dividing a two-dimensional picture formed by a video signal into a plurality of extracting periods, frames, fields, and areas. A first signal portion representing a moving area. Each unit extracting period corresponding to successive N (N being forming an extracted video signal by extracting only the first signal portion from one field of an extracting period in the moving area, in a moving area, and from another field representing a nonmoving period transmitting the extracted video signal and a position identification signal which indicates the position of the moving area formed by the first signal portion.

BRIEF DESCRIPTION OF THE DRAWINGS

FIG. 1 is a block diagram showing an embodiment of a video signal transmitting apparatus according to the present invention;

FIGS. 2A through 2F are timing charts showing the operation of various parts of the apparatus shown in FIG. 1; operation of various parts of the apparatus shown in FIGS. 3 and 4.

DETAILED DESCRIPTION OF A PREFERRED EMBODIMENT

Figure 3:
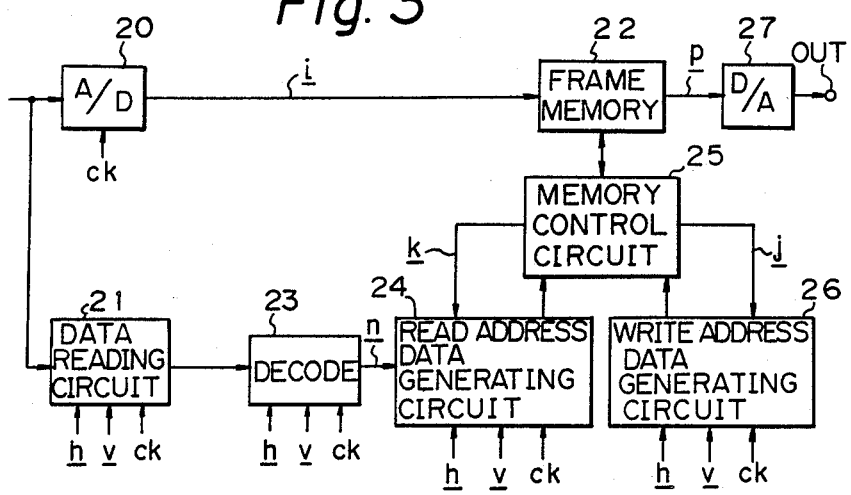

An embodiment of the present invention will be explained in detail with reference to the accompanying drawings.

In FIG. 1, a video signal outputted from a video tape recorder (not shown), for example, is supplied to an analog-to-digital converter (referred to as A/D converter hereinafter) 1. A clock pulse ck having a predetermined frequency from a pulse generator (not shown) is supplied to the A/D converter 1 as a sampling pulse signal. In the A/D converter 1, the sampling of the video signal is performed in accordance with the clock pulse ck, and digital data corresponding to the sampled value obtained by the sampling is generated in order. An output data a is supplied to a frame memory 2, a subtracting circuit 3, and an adder 4. The frame memory 2 comprises, for example, a memory of the FIFO (first in first out) type having a memory capacity for storing a data of one frame long. The frame memory 2 is configured to delay the output data a of the A/D converter 1 for one frame period by writing the output data a in order and reading-out the stored data in order according to the clock pulse ck.

An output data b of the frame memory 2 is supplied to the subtracting circuit 3, the adder 4, a field memory 5, and one of two input terminals of a changeover switch 6. The field memory 5 comprises, for example, a memory of the FIFO type having a memory capacity for storing a data of one field long, and configured to delay the output data b of the frame memory 2 by writing the output data b in order and reading-out the stored data in order according to the clock pulse ck.

In the subtracting circuit 3, the output data b of the frame memory 2 is subtracted from the output data a of the A/D converter 1. An output data of the subtracting circuit 3 is supplied to a lot pass filter (referred to as LPF hereinafter) 7 of a digital filter configuration. The LPF 7 is constructed to have a frequency characteristic for extracting a luminance signal component of the low frequency side from the output data of the subtracting circuit 3. On the other hand, the output data a of the A/D converter 1 and the output data b of the frame memory 2 are added together by the adder 4, and a data obtained by the addition is supplied to a band pass filter (referred to as BPF hereinafter) 8 of a digital filter configuration. The BPF 8 is constructed to have a frequency characteristic for separately extracting a color signal component of the high frequency side from the output data of the adder 4. Output data of the LPF 7 and the BPF 8 are supplied to a movement detection circuit 9.

The movement detection circuit 9 is configured to output a movement detection signal d when the output data of the LPF 7 or the output data of the BPF becomes higher than a predetermined value. The detection output signal of the movement detection circuit 9 is supplied to an area formation processing circuit 10. Horizontal and vertical sync signals h and v separated from the input video signal by a sync separating circuit (not shown), for example, and the clock pulse ck are supplied to the area formation processing circuit 10. The area formation processing circuit 10 is configured to perform operations of dividing a two-dimensional picture formed by a video signal corresponding to the output data of the frame memory 2 or the field memory a into a plurality of areas, sensing a movement detection signal d for the picture of each of the plurality of area in accordance with the horizontal and vertical sync signals h, v and the clock pulse ck, and outputting a moving area detection signal e when data corresponding to area with movement among the plurality of areas are outputted from the frame memory 2 or the field memory 5 by using the sensed movement detection signal d.

The moving area detection signal is supplied to a switch control input terminal of the changeover switch 6, and also to a coding circuit 11. As in the case of the area formation processing circuit 10, the horizontal and vertical sync signals h, v and the clock pulse ck are supplied to the coding circuit 11. The coding circuit 11 is configured to perform operations of sensing which of the plurality of areas of the two-dimensional picture the output data of the frame memory 2 or the field memory 5 corresponds to, by using the horizontal and vertical sync signals h, v and the clock pulse ck. The coding circuit 11 then outputs moving area position data indicating whether or not each area is moving by judging the moving area detection signal e. The total output signal is in the form of a pulse train signal for a period corresponding to predetermined horizontal scanning lines in the vertical blanking period. An output signal of the coding circuit 11 is supplied to one of two input terminals of the changeover switch 13.

An output data c of the field memory 5 is supplied to the other input of the changeover switch 6. The changeover switch selectively outputs the data b of the frame memory 2 when the moving area detection signal e is present, and selectively outputs data of the field memory 5 when the moving area detection signal is not present. An output data f of the changeover switch 6 is supplied to the other one of the input terminals of the changeover switch 13 after being converted to an analog signal by means of a digital-to-analog converter 12. To the changeover switch 13, an output signal of a switching control circuit 14 is supplied. The switching control circuit 14 is configured to output a switch command signal for a period corresponding to predetermined horizontal scanning lines in a vertical blanking period of the output data of the D/A converter 12 in accordance with horizontal and vertical sync signals h, v outputted from a sync separation circuit (not shown) and the clock pulse ck. The changeover switch 13 is configured to selectively output the output signal of the D A converting circuit 12 when the switching command is present, and selectively output the output signal of the coding circuit 11 when the switch command signal is not present. An output of this changeover switch 13 is transmitted through transmission mans such as the transmission line, or a recording medium.

The operation of various parts of the above-described apparatus will be explained with reference to FIG. 2. In FIG. 2, signs #1 through #7 represent data corresponding to pictures of one-field periods which are different from each other.

When the data #1 through #7 are outputted in order from the A/D converter 1 as the data a by the application of the video signal to the A/D converter 1, as illustrated in FIG. 2A, the output data b and c of the frame memory 2 and the field memory 5 will become as illustrated in FIGS. 2B and 2C.

In this state, if there is a difference more than a predetermined value between the luminance signals or the chrominance signals in a part of area of the two dimensional pictures formed by video signals corresponding to two data of one field period and having a time difference of one frame period, such as the data #1 and data #3, or the data #2 and data #4, the movement detection signal d is output from the movement detection circuit 9 as illustrated in FIG. 2D. Consequently, the movement detection signal d, corresponding to the picture of each of the plurality of areas of the two dimensional picture formed by the video signal corresponding to the output data of the frame memory 2 or the field memory 5, is sensed in the area formation processing circuit 10, and the moving area detection signal e will be output as illustrated in FIG. 2E when the data corresponding to areas having movement among the plurality of areas is output from the frame memory 2 or the field memory 5, by using the sensed movement detection signal d.

By this moving area detection signal e, the operation of the changeover switch 6 is controlled, so that the changeover switch 6 outputs the data f as illustrated in FIG. 2F. Data is extracted by switch 6 among the data corresponding to the moving areas, This data f is converted to an analog signal by the A/D converter 12, to form a video signal compressed at a compression factor of $\frac{1}{2}$ with respect to the time axis. To this video signal, the moving area position data output from the coding circuit 11 is inserted by means of the changeover switch 13, and supplied to a transmitting means for the transmission.

As described above, since the video signal is compressed at a compression factor of $\frac{1}{2}$, it becomes possible to transmit to channels of video signals through single transmission line or a single recording medium.

FIG. 3 shows an apparatus for effecting a time-base expansion of a video signal processed by a compression factor of $\frac{1}{2}$, transmitted by the apparatus shown in FIG. 1. In FIG. 3, the video signal compressed in time-base is supplied to an A/D converter 20 and a data reading circuit 21. A clock pulse ck having a predetermined frequency is supplied from a pulse generator (not shown) to the A/D converting circuit 20 as the sampling pulse. In the A/D converting circuit 20, the sampling of the video signal is performed in accordance with the clock pulse c, and digital data corresponding to the sampled value An output data i of this A/D converter 20 is supplied to a frame memory 22. The frame memory has a memory capacity for storing data one frame.

To the data reading circuit 21, the horizontal and vertical sync signals h and v separated from the input video signal for example, by the sync separating circuit (not shown) are supplied. The data reading circuit 21 is configured to sense a portion of the video signal corresponding to predetermined horizontal scanning lines in the vertical blanking period by using the horizontal and vertical sync signals h and v, and to read-out the moving area position data by extracting the pulse train signal inserted in the sensed portion of the video signal. The moving area position data read-out by the data reading circuit 21 is supplied to a decoder 28. The decoder 23 is configured to perform operations of recording the output of the data reading circuit 21, sensing the timing output from the A/D converter 20 by means of the horizontal and vertical sync signals h, v and the clock pulse ck, and generating a moving area signal n indicating whether or not the decoded area has movement An output of the decoder 23 is supplied to a read-out address data generating circuit 24. A read-out control signal k, the horizontal and vertical sync signal h, v, and the clock pulse ck output from a memory control circuit 2 are supplied to the read-out address data generating circuit 24. The read-out address data generating circuit 24 is configured to output a read-out address data varying in accordance with the horizontal and vertical sync signals h, v and the clock pulse ck when the read-out control signal k is present. The output of the read-out address data generating circuit 24 is supplied to a memory control circuit 25. An output signal of a write address data generating circuit 26 is supplied to the memory control circuit 22. A write control signal j, the horizontal and vertical sync signals h, v and the clock pulse ck output from the memory control circuit 25 are supplied to the write address data generating circuit 26. The memory control circuit 25 is configured to perform the operations of generating, at intervals of two frames, a write control signal j existing for the period of one frame generating a read-out control signal k existing for the period of two frames and performing the address control of the frame memory 22 in accordance with output data of the write address data generating circuit 26 and the read address data generating circuit 24. A data p output from the frame memory 22 which is controlled by the memory control circuit 25 is converted to an analog signal by a D/A converter 27, and in turn supplied to an output terminal OUT.

Figure 4:
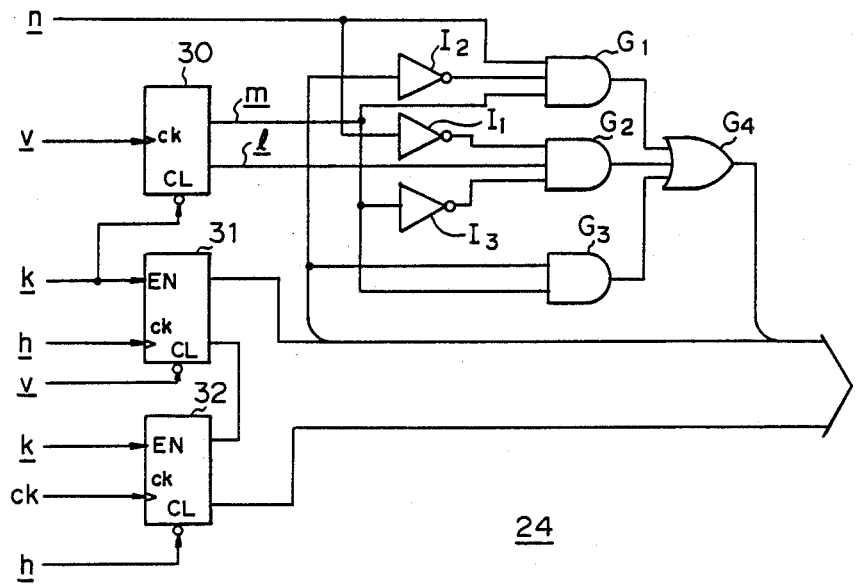

FIG. 4 is a block diagram showing a specific circuit construction of the read address data generating circuit 24. In FIG. 4, the moving area signal is directly supplied to an AND data $G_1$, and also to an AND gate $G_2$ through an invertor $I_1$. A signal m corresponding to the high-order bits of an output of a two-bit counter 30 is output of the counter 30 is directly supplied to the AND gate $G_2$. The signal m is directly supplied to the AND gate $G_1$ and the signal l is supplied to it through an invertor $I_2$. In addition, the signals m and l are directly supplied to an AND age $G_3$. Output signal of the AND gates $G_1$ through $G_3$ are supplied to the memory control circuit 25 through an OR gate $G_4$ as the most significant bit of the read address data.

The two-bit counter 30 i connected to count-up by the vertical sync signal v, and to be reset when the read control signal is no: present. The low-order bit of the output of this two-bit counter 30 is supplied to the memory control circuit 25 as a bit next to the most significant bit of the read address data. On the other hand, the counter 31 is connected to count-up by the horizontal sync signal When the read control signal k is present, and to be reset by the vertical sync signal v. An output data of the counter 31 is supplied to the memory control circuit 2 as the high-order bits of bit group excluding high-order two bits of the read address data. The low-order bits of the bit group excluding the high-order two bits of the read address data are formed by the output of the counter 32. The counter 32 is horizontal sync signal h.

The operation of each part of the above described circuit construction will be explained with reference to FIG. 5. In FIG. 5, as in the case of FIG. 2, the signs #1 through #4 represent data corresponding to pictures of periods of one field long which are different from each other.

When a video signal compressed at a compression ratio of ½ is supplied to the A/D converter 20 and the data reading circuit 21 for a period of two frames, a data is a illustrated in FIG. 4A is outputted from the A/D converter 20.

In addition, the vertical sync signal v is separated from the video signal by the sync separating circuit which is not illustrated, and the write control signal j and the read control signal k are output from the memory control circuit 2 as illustrated in FIGS. 5B and 5C. As a result, data output from the A/D converter 20 for the period of one frame is written in order in the frame memory 22, and the read-out operation continuing for the period of to frames is started at the same time. During the period of read-out of the data from the frame memory 22, the signal l corresponding to the low-order bits of the counter 30 turns-over every time the period of one field elapses, as illustrated in FIG. 5D. On the other hand, the signal corresponding to the high order bits of the output of the counter 30 turns-over every time the period of one frame elapses, as illustrated in FIG. 5E.

On the other hand, the movement signal inserted in the portion of the time-compressed video signal corresponding to the predetermined horizontal lines, is read by the data reading circuit 21, and in turn supplied to the decoder 23. In the decoder 23, the period in which the portion of the data written in the frame memory 23 corresponding to the movement is sensed by the movement signal, and the moving area signal n as illustrated in FIG. 5F is output, and supplied to the address generating circuit 24.

In response to the moving area signal n, and the signals l and m, a signal o corresponding to the most significant bit of the read address data varies as shown in FIG. 5G. When this signal o corresponding to the most significant bit of the read address data has a low level, an address in which the data supplied to the frame memory 22 for a first field period $T_1$ is to be stored is designated. When this signal o has a high level, the address in which the data supplied to the frame memory 22 for a second field period $T_2$ is to be stored is designated. As a result in the first field period $T_1$ the data #1, that is, the data written in the first field period is directly read-out from the frame memory 22. In the second field period $T_2$, the data #1 is read-out as the data of the portion corresponding to the moving area, and the data #2 is directly read-out as the data corresponding to the non-moving area. In a third field period $T_3$, the data #3 written in the second field period $T_2$ is read-out as the data of the portion corresponding to the moving area, and the data #1 written in the first field period $T_1$ is read-out as the data of the portion corresponding to the till area. In a fourth field period $T_4$, data #3 written in the second field period $T_2$ is read-out as the data of the portion corresponding to the moving area, and the data #2 written in the second field period $T_2$ is read-out as the data of the portion corresponding to the till area. Consequently, the data p read-out from the frame memory 22 becomes as illustrated in FIG. 5H. Since #1=#3 and #2=#4 in the still area, the picture obtained by this procedure becomes equal to the picture illustrated in FIG. 5I.

As will be appreciated from FIG. 5I, the still area of each original field is used for the formation of new fields. On the other hand, the moving area in the first and second field is formed by the video signal generated in the first field period, and the moving area in the third and fourth field periods is formed by the video signal generated during the second field period. With this feature, the vertical resolution of the still area is not reduced, and the order of data in the moving area will not be reversed. Thus, the generation of unnatural movements such as movements in the backward order is prevented.

In the above embodiment, the moving area position data is inserted in the portion of the video signal corresponding to predetermined horizontal lines in the vertical blanking period so that it is transmitted with the video signal. However, it is also possible to use an arrangement such that the moving area position data is inserted, by a multiplex system, in a vacant spectrum area of the transmission line of the recording medium.

As explained specifically in the above, a video signal transmission system according to the present invention is characterized as follows: A two-dimensional picture formed by a video signal is divided into a plurality of extracting periods, frames, fields, and areas, a first signal portion representing a moving area The plurality of areas for each unit extracting period corresponding to successive N (N being a natural number) frames of the video signal. An extracted video signal is formed by extracting only the first signal portion from one field of an extracting period in the moving area, and extracting a portion from another field of the extracting period representing a nonmoving period. This extracted video signal and a position identification signal which indicates the position of the moving area formed by the first signal portion. With this process, video signals of a plurality of channels can be transmitted through a single transmission line and also the transmission of video signals by means of the recording and reproducing using a single recording medium is made possible. Furthermore, the picture in the still area can be reproduced by area generated in the even field period and in the odd field period. The picture in the moving area for the first and second field period can be formed by the area generated in the first field period, and the picture in the moving area for the third and fourth field periods can be formed by the areas generated in the third field period. Thus according to the present invention, the vertical resolution of the still area is not reduced, and the order of data in the moving area will not be reversed so that the generation of unnatural movements is prevented.

What is claimed is:

1. A method of transmitting a video signal, comprising the steps of:
   dividing a two-dimensional picture formed by said video signal into a plurality of extracting periods, each extracting period having a plurality of frames, each frame having a plurality of fields, and each field having a plurality of areas;
   detecting a first signal portion representing one of said areas of one of said fields of one of said extracting periods in which movement of said picture has taken place from one frame to another frame in said one extracting period:
   forming an extracted video signal by extracting only said first signal portion from said one field of said one extracting period, and extracting from at least one other field of said one extracting period a second signal portion representing a nonmoving area; and
   combining for transmission said extracted video signal an a position identification signal which indicates the position of said first signal portion in said one extracting period.

2. A method as set forth in claim 1, herein said first signal portion is extracted from one field of said video signal in every N fields of said video signal.

3. A method as set forth in claim 1 wherein each frame comprises two fields, and wherein said extracting comprises extracting said first signal portion from one field of said one frame of said one extracting period and extracting said second signal portion from one field and part of another field of said one other frame of the same extracting period.

4. A method as set forth in claim 3 wherein said part of said another field of said one other frame comprises a portion thereof corresponding to nonmoving areas of said one field of said one frame.

5. A method as set forth in claim 4 herein each extracting period comprises two frames.

6. An apparatus for transmitting a video signal, comprising:
   an input means for receiving said video signal representing a picture;
   a detection means for detecting portions of said video signal representing movement of said picture;
   a dividing means for dividing a two-dimensional picture formed by said video signal into a plurality of extracting periods, each extracting period having a plurality of frames, each frame having a plurality of field, each field having a plurality of areas;
   a first signal portion detecting means for detecting a first signal portion representing one of said areas of one of said fields of one of said extracting periods in which movement of said picture has taken place from one frame to another frame in said one extracting period;
   an extracting video signal forming means for forming an extracted video signal by extracting only said first signal portion from said one field, and extracting from at least one other field of said on extracting period a second signal portion representing a nonmoving area; and
   a combining means for combining for transmission said extracted video signal and a position identification signal which indicates the position of the first signal portion in each unit extracting period.

7. A method as set forth in claim 6, wherein said first signal portion is extracted from one field of said video signal in every N fields of said video signal.

8. An apparatus as set forth in claim 6 wherein each frame comprises to fields, and herein said extracted video signal forming means extracts said first signal portion from one field of said one frame of said one extracting period and extracts said second signal portion from one field and part of another field of said one other frame of the same extracting period.

9. An apparatus as set forth in claim 8 wherein said part of said another field of said one other frame comprises a portion thereof corresponding to nonmoving areas said one field of said one frame.

10. A method as set forth in claim 9 wherein each extracting period comprises two frames.

* * * * *